United States Patent
Kamada

(10) Patent No.: US 7,435,197 B2
(45) Date of Patent: Oct. 14, 2008

(54) REAR SPROCKET FOR BICYCLE TRANSMISSION

(75) Inventor: Kenji Kamada, Osaka (JP)

(73) Assignee: Shimano Inc., Osaka (JP)

( * ) Notice: Subject to any disclaimer, the term of this patent is extended or adjusted under 35 U.S.C. 154(b) by 383 days.

(21) Appl. No.: 11/126,409

(22) Filed: May 11, 2005

(65) Prior Publication Data

US 2006/0258499 A1    Nov. 16, 2006

(51) Int. Cl.
*F16H 55/30*    (2006.01)
(52) U.S. Cl. .................. 474/152; 474/902; 474/903
(58) Field of Classification Search .................. 474/78, 474/160, 152, 902, 903
See application file for complete search history.

(56) References Cited

U.S. PATENT DOCUMENTS

| | | | |
|---|---|---|---|
| 4,047,603 A | 9/1977 | Ozaki | |
| 4,121,474 A * | 10/1978 | Arregui Suinaga | .......... 474/160 |
| 4,324,323 A | 4/1982 | Campagnolo | |
| 4,580,670 A | 4/1986 | Nagano | |
| 4,869,710 A | 9/1989 | Iwasaki | |
| 5,194,051 A | 3/1993 | Nagano | |
| 5,738,197 A | 4/1998 | Kroger et al. | |
| 5,788,593 A | 8/1998 | Tiong | |
| 5,882,088 A | 3/1999 | Yahata | |
| 5,954,604 A * | 9/1999 | Nakamura | ................... 474/160 |
| 6,013,001 A | 1/2000 | Miyoshi | |
| 6,102,821 A | 8/2000 | Nakamura | |
| 6,340,338 B1 | 1/2002 | Kamada | |
| 6,382,381 B1 | 5/2002 | Okajima et al. | |
| 6,866,604 B2 * | 3/2005 | Kamada et al. | ............. 474/160 |

\* cited by examiner

*Primary Examiner*—Richard WL Ridley
*Assistant Examiner*—Terence Boes
(74) *Attorney, Agent, or Firm*—Global IP Counselors, LLP

(57) ABSTRACT

A bicycle transmission has among other things a rear hub with a freewheel with an outer freewheel body supporting a plurality of sprockets. A chain is shifted between adjacent pairs of the sprockets by a rear derailleur. Each sprocket includes inner attachment portion and a chain engaging portion having annular root portion and a plurality of teeth. The largest (low gear) sprocket has one or more recesses in the lateral surface that faces towards the center of the bicycle so that the largest (low gear) sprocket overlaps the abutments of the outer freewheel body.

10 Claims, 8 Drawing Sheets

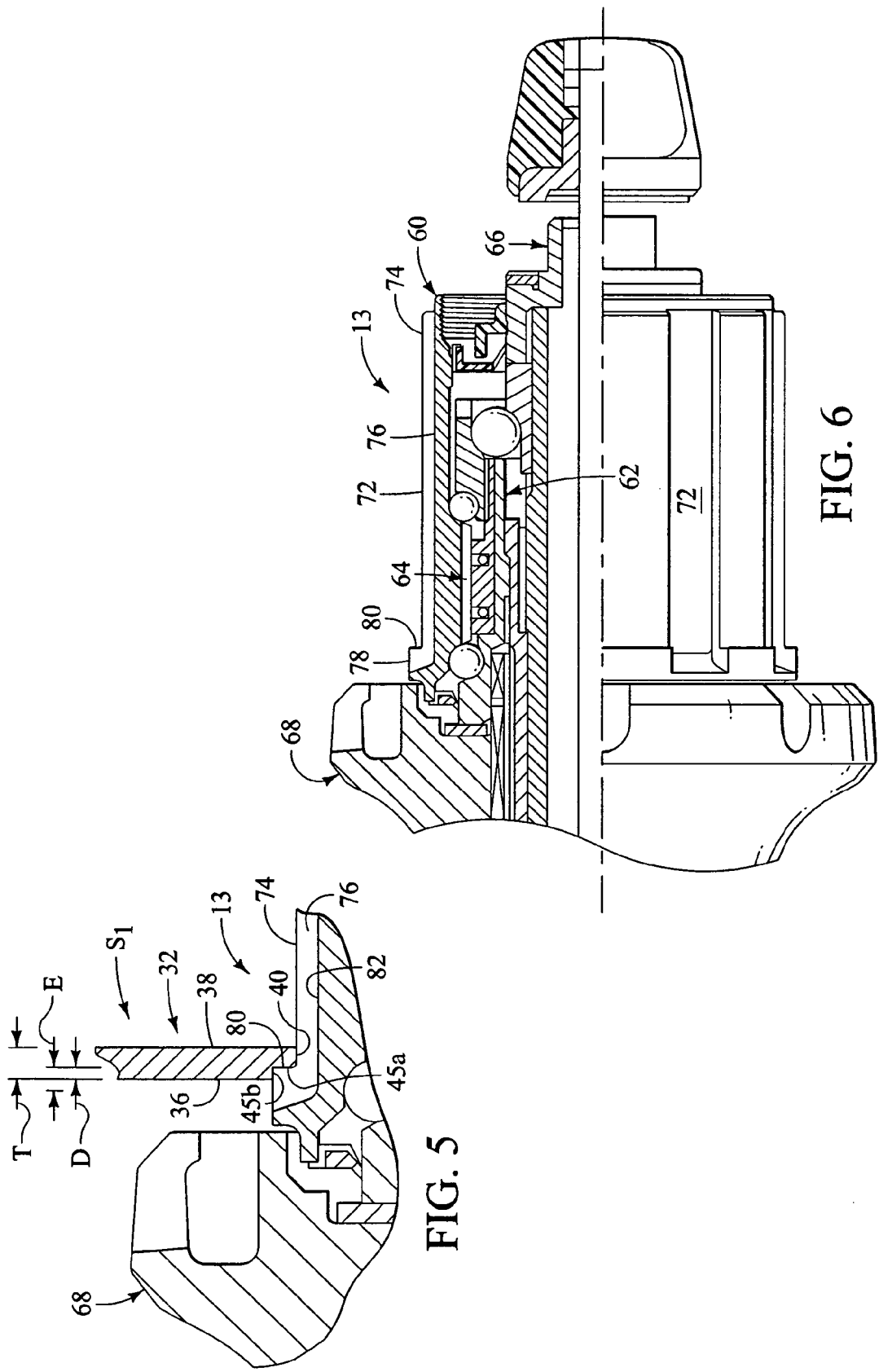

REAR SPROCKET FOR BICYCLE TRANSMISSION

BACKGROUND OF THE INVENTION

1. Field of the Invention

This invention generally relates to a sprocket for a bicycle transmission. More specifically, the present invention relates to a rear sprocket for a bicycle transmission having a large number of rear gears or sprockets.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle transmission.

Over the past several years, bicycle riders have desired an increased number of speeds or gear ratios available in bicycle transmissions. Thus, over the past several years, the bicycle industry has increased the number of sprockets installed on the rear-wheel sprocket assembly of bicycles in order to provide additional different gear ratios. Specifically, road bicycles have seen the number of rear sprockets increase from five (5) to nine (9) to provide additional different gear ratios for the bicycle transmission. Mountain bicycles have also seen the number of rear sprockets increase -similarly. Even more recently, in more recent years, the number of rear sprockets has increased from nine (9) to ten (10) rear sprockets on some bicycles (i.e. road bicycles in particular).

While these ten (10) speed rear sprocket assemblies work well, they suffer from some deficiencies. In particular, ten (10) speed rear sprocket assemblies are typically wider in the axial direction than the previous nine (9) speed rear sprocket assemblies. Accordingly, it can be difficult or even impossible to mount the ten (10) speed rear sprocket assemblies on some rear freewheel assemblies that were originally designed for nine (9) rear sprockets. Additionally, even if the ten (10) speed rear sprocket assemblies can be mounted on rear freewheel assemblies that were originally designed for nine (9) rear sprockets, shifting performance can be adversely affected.

More specifically, in the current the ten (10) speed rear sprocket assemblies, the sprockets and the spacers have typically been constructed to be slightly narrower than the previous nine (9) rear sprockets and spacers, and a narrower chain has been utilized in order to achieve the desired shifting performance with the increased number of rear sprockets. However, even when such modifications are made, the ten (10) speed rear sprocket assembly (cassette) is still typically about 1.0 millimeter wider than a nine (9) speed rear sprocket assembly (cassette). Accordingly, if a ten (10) speed rear sprocket assembly (cassette) is mounted in the current manner, the top sprocket (smallest, outermost sprocket) is located laterally outwardly by about 1.0 millimeter more than the top sprocket of a nine (9) speed sprocket assembly (cassette) mounted on the typical freewheel. In some cases, this arrangement may result in the chain touching the bicycle frame when the chain is located on the rear top sprocket (e.g. if the chain is also located on the front top sprocket or largest outermost front chain ring and/or in certain riding conditions).

In view of the above, it will be apparent to those skilled in the art from this disclosure that there exists a need for an improved rear sprocket for a rear sprocket assembly. This invention addresses this need in the art as well as other needs, which will become apparent to those skilled in the art from this disclosure.

SUMMARY OF THE INVENTION

One object of the present invention is to provide a rear sprocket for a rear bicycle sprocket assembly that includes ten (10) sprockets, which can be mounted on an outer freewheel body in a space normally provided for a nine (9) sprocket assembly.

Another object of the present invention is to provide a rear sprocket for a rear bicycle sprocket assembly that includes ten (10) sprockets, which optimizes shifting performance without adversely affecting strength.

Another object of the present invention is to provide a rear sprocket for a rear bicycle sprocket assembly that includes ten (10) sprockets, which projects axially outwardly only about 0.25 millimeter further than a nine (9) sprocket assembly mounted on the same outer freewheel body.

Another object of the present invention is to provide a rear sprocket for a rear bicycle sprocket assembly, which is relatively simple and inexpensive to manufacture and assemble on the outer freewheel body.

Yet another object of the present invention is to provide an outer freewheel body that facilitates the mounting of a rear bicycle sprocket assembly that includes ten (10) sprockets as described in the previous objects of the present invention.

The foregoing objects can basically be attained by providing a rear sprocket for bicycle transmission that comprises an inner attachment portion, an annular root portion and a plurality of teeth. The inner attachment portion has a first lateral surface facing in a first axial direction, a second lateral surface facing in a second axial direction and an inner peripheral edge extending between the first and second lateral surfaces. The annular root portion is located radially outward of the inner attachment portion with the annular root portion having a first side surface facing in the first axial direction and a second side surface facing the second axial direction such that the second side surface and the second lateral surface lie in a common plane. The teeth extend radially outward from an outer periphery of the root portion. The inner attachment portion has at least one recess formed on the first lateral surface and extending radially outward from the inner peripheral edge.

The foregoing objects can also be basically be attained by providing an outer freewheel body for bicycle transmission that comprises a tubular portion and an abutment surface. The tubular portion has an outer surface with a plurality of sprocket engaging splines extending in an axial direction to define a plurality of sprocket engaging grooves disposed between the splines. The abutment surface is disposed at one end of at least one of the splines and faces in a first direction to limit axial movement of a sprocket. The grooves have bottom surfaces that extend beyond the abutment surface in an opposite axial direction relative to the first direction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is an enlarged, partial cross-sectional view of the rear hub illustrated in FIGS. 2-4 with only the bottom (largest) sprocket of the sprocket assembly coupled thereto, as seen along section line 5-5 of FIG. 2;

FIG. 6 is an enlarged, partial cross-sectional view of the freewheel side of the rear hub illustrated in FIGS. 2-4, as seen along section line 5-5 of FIG. 2;

DETAILED DESCRIPTION OF THE PREFERRED EMBODIMENTS

Figure 1:
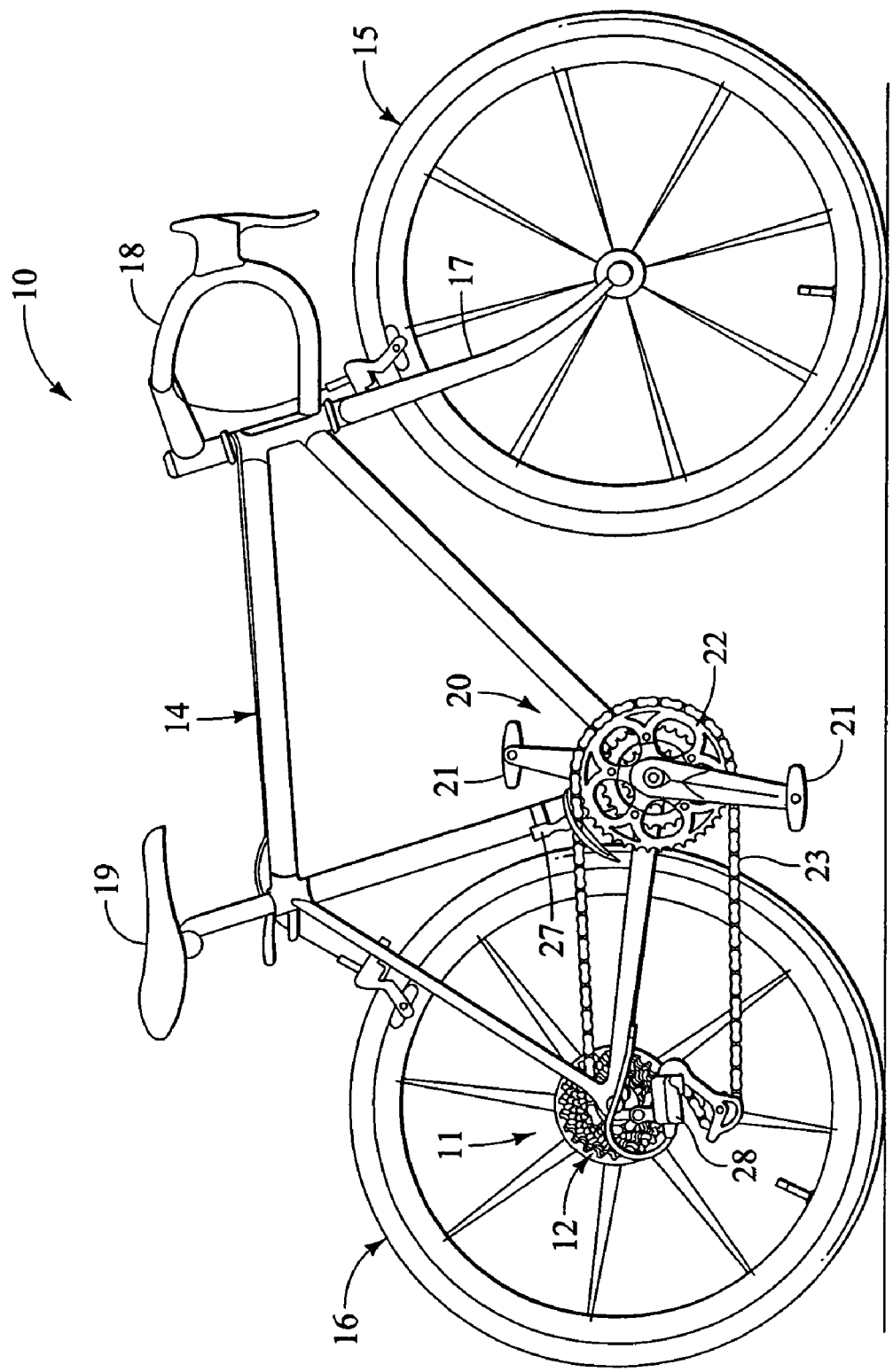
FIG. 1 is a side elevational view of a bicycle having a rear wheel with a bicycle sprocket assembly in accordance with a first embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-4, a bicycle 10 is illustrated having a rear bicycle hub 11 with a multi-stage rear sprocket assembly (cassette) 12 mounted on a freewheel 13 in accordance with a first embodiment of the present invention. The rear sprocket assembly 12 includes ten (10) rear sprockets $S_1$-$S_{10}$ that are mounted on the freewheel 13 with a plurality of spacers $U_1$-$U_9$ arranged between the sprockets $S_1$-$S_{10}$. The sprocket $S_1$ is the largest (i.e. has the most teeth), innermost sprocket of the rear sprocket assembly 12. The sprocket $S_{10}$ is the smallest (i.e. has the fewest teeth), outermost sprocket. In the illustrated embodiment, the sprockets $S_1$-$S_{10}$ have 23T, 21T, 19T, 17T, 16T, 15T, 14T, 13T, 12T, 11T tooth configurations, respectively. However, it will be apparent to those skilled in the bicycle art from this disclosure that the sprockets $S_1$-$S_{10}$ can have different tooth configurations as needed and/or desired.

The sprocket assembly 12 and the freewheel 13 are configured and arranged such that the smallest sprocket $S_{10}$ is located axially only about 0.25 millimeter or less outwardly of the location normally occupied by the smallest sprocket of a conventional nine (9) speed rear sprocket assembly (cassette), when mounted on the freewheel 13. In particular, the rear sprocket assembly 12 of the present invention is about 1.0 millimeter wider than a conventional nine (9) speed rear sprocket assembly as measured axially. However, the largest rear sprocket $S_1$ and the freewheel 13 are configured and arranged such that the rear sprocket assembly 12 is located about 0.75 millimeter or more closer to a center plane P of the bicycle 10 than a conventional nine (9) speed rear sprocket assembly when mounted on the freewheel 13, as explained below in more detail.

Referring to FIG. 1, the bicycle 10 basically has a frame 14 with front and rear wheels 15 and 16 rotatably coupled thereto. A front fork 17 is pivotally coupled to the front of the frame 14 with the front wheel 15 rotatably coupled thereto in a conventional manner. A handlebar 18 is rigidly attached to the front fork 17 in order to turn the front wheel 15 to steer the bicycle 10. The rear wheel 16 is rotatably coupled to a rear portion or rear triangle of the frame 14 via the rear hub 11 in a conventional manner. A seat 19 is adjustably coupled to the frame 14 via a seat post in a conventional manner, and a drive train 20 is provided on the bicycle 10 for propelling the bicycle 10. The bicycle 10 is conventional except for selected parts of the drive train 20, as discussed below.

The drive train 20 basically includes the rear multi-stage sprocket assembly 12 of the present invention, a pair of pedals 21, a front multi-stage sprocket assembly 22 mounted to rotate with the pedals 21, and a chain 23 extending between the rear multi-stage sprocket assembly 12 and the front multi-stage sprocket assembly 22. As mentioned above, the rear sprocket assembly 12 is preferably coupled to the rear hub 11 via the freewheel 13. The pedals 21 are coupled to the front multi-stage sprocket assembly 22 by a conventional crank set to transfer force from the rider to the chain 23. The force from the chain 23 is selectively transferred to the rear wheel 16 via the rear hub 11 (e.g. via the rear sprocket assembly 12 and the freewheel 13 depending on the direction of rotation) in a conventional manner. The chain 23 used in the drive train 20 is designed to be compatible with the rear ten-stage sprocket assembly 12. In particular, the chain 23 is preferably slightly narrower than a chain used with a conventional rear nine-stage sprocket assembly due to the width and spacing of the sprockets $S_1$-$S_{10}$. Narrower chains such as chain 23 are well known in the bicycle art. Accordingly, the chain 23 will not be explained and/or illustrated in detail herein. Similarly, the front sprocket assembly 22 is configured to be compatible with the relatively narrower chain 23. Such front sprocket assemblies 22 are well known in the bicycle art. Accordingly, the front sprocket assembly 22 will not be explained and/or illustrated in detail herein.

The drive train 20 is basically controlled by conventional front and rear shifting units (not shown) that control the lateral positions of front and rear derailleurs 27 and 28 in a conventional manner. Thus, when the rider is pedaling, the front and rear sprocket assemblies 22 and 12 are rotating to circulate or cycle the chain 23 due to the movement of the pedals 21. The shifting units (not shown) can be actuated by the rider to control the lateral positions of the front and/or rear derailleurs 27 and/or 28. When the chain 23 is circulated or cycled in the forward (clockwise direction as seen in FIG. 1), the shifting units can be actuated to control the gear ratio of the drive train 20 by controlling the lateral position of the chain 23 via the derailleurs 27 and 28 in a conventional manner. The derailleurs 27 and 28 selectively apply a lateral force inwardly/outwardly to the chain 23 to cause up/down shifts in a conventional manner. The drive train 20 is basically conventional, except for the rear multi-stage sprocket assembly 12 and the freewheel 13. Thus, the drive train 20 will not be discussed and/or illustrated in further detail herein, except as related to the rear multi-stage sprocket assembly 12 and the freewheel 13.

Since the various parts of the bicycle 10 and most of the parts of the drive train 20 are well known in the bicycle art, these parts of the bicycle 10 and the drive train 20 will not be discussed and/or illustrated in detail herein, except as related to the present invention. However, it will be apparent to those skilled in the bicycle art from this disclosure that various conventional bicycle parts such as brakes, different hub structures, etc., which are not illustrated and/or discussed in detail herein, can be used in conjunction with the present invention as needed and/or desired.

Referring now to FIGS. 2-10, the rear sprocket assembly (cassette) 12 in accordance with the present invention will now be explained in more detail. As mentioned above, the rear sprocket assembly 12 includes ten (10) rear sprockets $S_1$-$S_{10}$ that are mounted on the freewheel 13 with the plurality of spacers $U_1$-$U_9$ arranged between the sprockets $S_1$-$S_{10}$ such that the sprockets $S_1$-$S_{10}$ are spaced from each other at predetermined intervals. The sprockets $S_1$-$S_{10}$ and the spacers $U_1$-$U_9$ are fixedly mounted on the freewheel 13 of the rear hub 11 such that the sprockets $S_1$-$S_{10}$ rotate together about a center hub rotation axis X. The sprockets $S_1$-$S_{10}$ typically rotate together in a forward rotational direction R (e.g., in a clockwise direction as viewed in FIG. 1) when the rider is pedaling in a forward (clockwise) direction to propel the bicycle 10 in a forward direction as seen in FIG. 1.

In the illustrated embodiment, each of the spacers $U_1$-$U_9$ preferably has an axial thickness of about 2.35 millimeters in order to provide the desired spacing for the sprockets $S_1$-$S_{10}$. Each of the sprockets $S_1$-$S_{10}$ preferably has a substantially uniform maximum axial thickness T of about 1.60 millimeters. Accordingly, the assembled rear sprocket assembly 12 (i.e. the assembled sprockets $S_1$-$S_{10}$ and spacers $U_1$-$U_9$) preferably has an axial width of about 37.5 millimeters as compared to an axial width of about 36.5 millimeters for a conventional nine (9) speed rear sprocket assembly (not shown) having slightly thicker sprockets and spacers. However, in the illustrated embodiment, the sprocket $S_1$ is configured and arranged to be located about 0.75 millimeter or more closer to the center plane P of the bicycle 10 than a conventional nine (9) speed rear sprocket assembly, as explained below.

Figure 9:
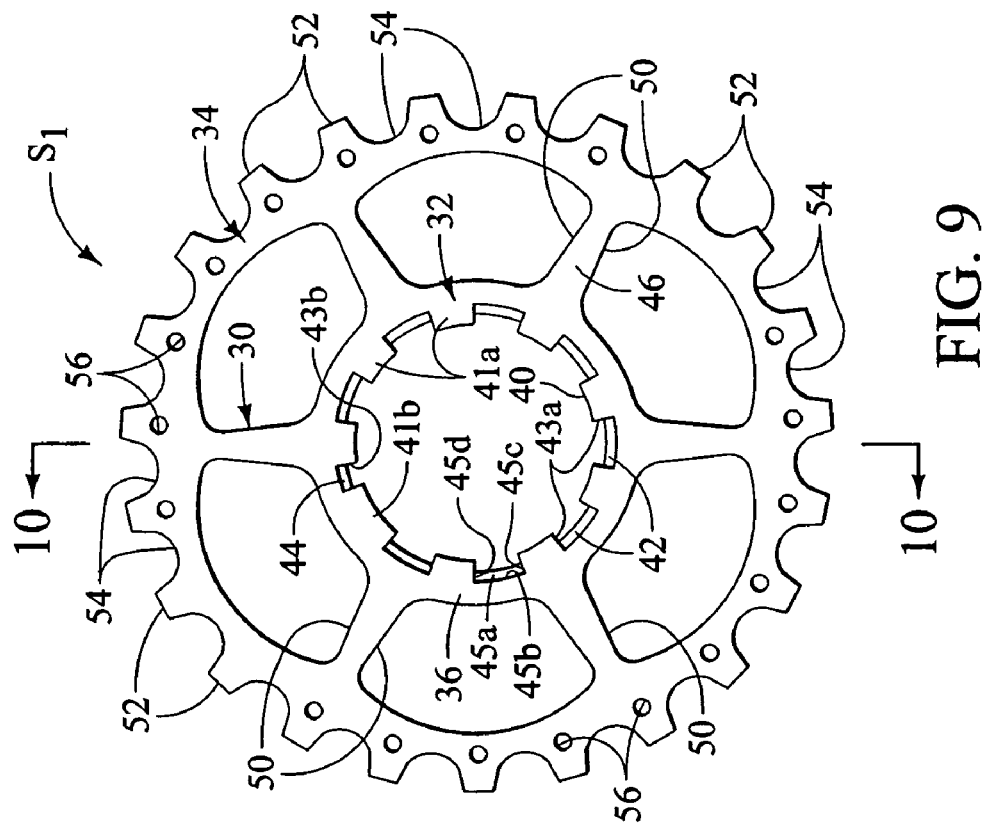
FIG. 9 is an outside elevational view of the bottom sprocket (i.e. the largest, innermost rear sprocket) of the sprocket assembly illustrated in FIG. 8.
Figure 8:
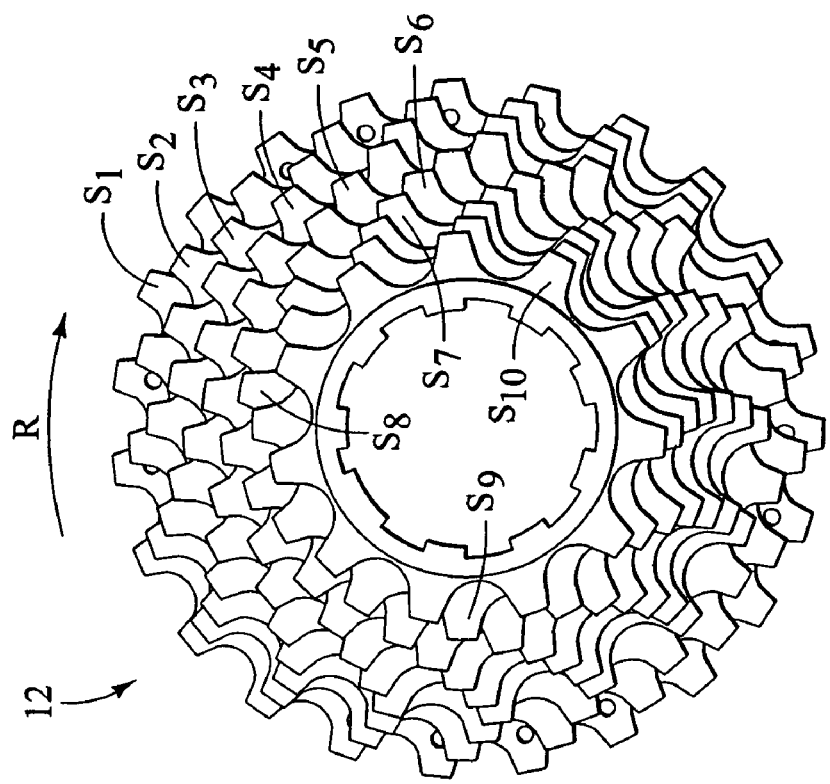
FIG. 8 is an enlarged, outside elevational view of the sprocket assembly illustrated in FIGS. 2-4.
Figure 10:
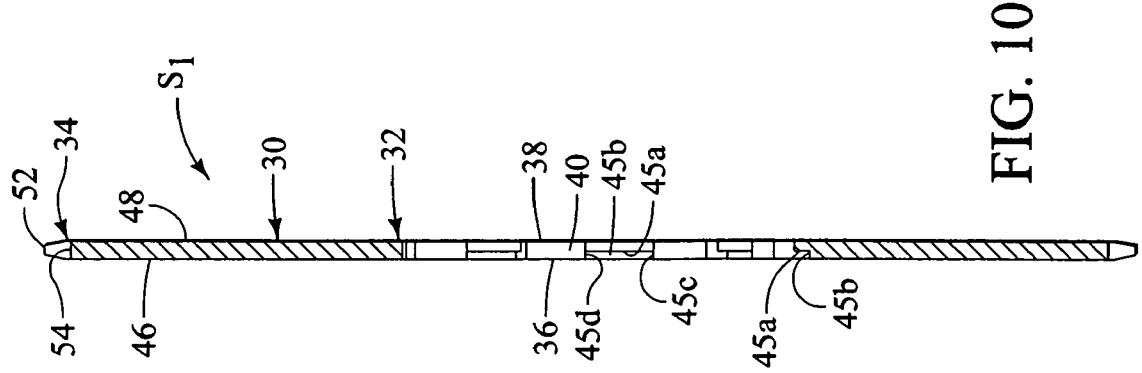
FIG. 10 is an enlarged, cross-sectional view of the sprocket illustrated in FIG. 9, as seen along section line 10-10 of FIG. 9.

Referring mainly to FIGS. 8-10, the sprocket $S_1$ basically includes an annular main body portion 30, an inner annular attachment portion 32 and an annular chain engagement or root portion 34. Preferably, the main body portion 30, the inner attachment portion 32 and the annular chain engagement portion 34 are integrally formed together as a one-piece, unitary member from a lightweight, rigid material such as a metallic material (e.g. titanium alloy) with a surface treatment applied thereto in a conventional manner. The inner attachment portion 32 extends radially inwardly from the main body portion 30, while the chain engagement portion 34 extends radially outwardly from the main body portion 30.

The inner attachment portion 32 includes a first annular lateral surface 36, a second lateral surface 38, an inner peripheral edge (surface) 40, a plurality of primary recesses 42 and a position recess 44. The first lateral surface 36 faces in a first axial direction (i.e. toward the center plane P). The second annular lateral surface 38 faces in a second axial direction (i.e. away from the center plane P). The inner peripheral edge 40 extends between the first and second lateral surfaces 36 and 38. The recesses 42 and 44 are arranged and configured such that the sprocket $S_1$ will be located axially closer to the center plane P of the bicycle 10 than a conventional nine (9) speed rear sprocket assembly, as explained below. The first and second lateral surfaces 36 and 38 are preferably parallel to each other, and preferably perpendicular to the inner peripheral edge 40.

The inner peripheral edge 40 is preferably a notched surface with a plurality of primary hub engaging projections 41a and a positioning hub engaging projection 41b. The hub engaging projections 41a and 41b define a plurality of primary hub engaging slots 43a and a positioning hub engaging slot 43b disposed between the hub engaging projections 41a and 41b, as seen in FIG. 9. The hub engaging projections 41a and 41b extend radially inwardly. The inner peripheral edge 40 is configured and arranged to non-rotatably mate with a corresponding exterior surface of the freewheel 13, explained below. In particular, the positioning hub engaging projection 41b and the positioning hub engaging slot 43b are arranged in a particular orientation relative to the chain engagement portion 34. The sprockets $S_2$-$S_{10}$ have similar structures to orient the teeth of the various sprockets relative to each other to optimize shifting in a conventional manner.

The recesses 42 and 44 are preferably formed in the first lateral surface 36. In the illustrated embodiment with the sprocket $S_1$ having a thickness T of about 1.60 millimeter, the recesses 42 and 44 preferably have an axial depth D of 0.75 millimeter (preferably between 0.75 and 0.80 millimeter). Thus, in the illustrated embodiment the depth D is preferably about one-half or slightly less than one-half of the thickness T of the sprocket $S_1$. In any case, in the illustrated embodiment with the sprocket $S_1$ having a thickness T of about 1.60, the depth D is preferably at least 0.75 millimeter and less than or equal to 1.0 millimeter. Accordingly, with this configuration, the sprocket $S_{10}$ will be located between 0.00 and 0.25 millimeter axially outwardly of the normal position of a top (small) sprocket of a conventional nine (9) speed rear sprocket assembly (preferably 0.25 millimeter).

The primary recesses 42 are disposed radially outwardly of the primary hub engaging slots 43a, while the positioning recess 44 is disposed radially outwardly of the positioning hub engaging slot 43b. The recesses 42 and 44 permit the sprocket $S_1$ to be mounted on the freewheel 13 to be axially about 0.75 millimeter closer to the center plane P than a conventional nine (9) speed rear sprocket assembly, as explained in more detail below.

Each of the recesses 42 and 44 has a mating configuration to engage the freewheel 13, described below. In particular, each of the recesses 42 and 44 has a substantially rectangular configuration as viewed axially (FIG. 9) with curved inner and outer radially spaced ends. Each of the primary recesses 42 includes a contact surface 45a and a curved outer radial end surface 45b with axially extending ends 45c and 45d extending radially inwardly therefrom. The contact surfaces 45a are preferably parallel to the first lateral surface 36, while the surfaces 45b, 45c and 45d are preferably perpendicular to the contact surfaces 45a. The depth D is measured axially between the contact surfaces 45a and the first lateral surface 36. The positioning recess 44 has a configuration identical to the primary recesses 42, but is slightly smaller.

The main body portion 30 of the sprocket $S_1$ includes a first annular side surface 46 facing in the first axial direction and a second annular side surface 48 facing in the second axial direction with a plurality of cutouts 50 extending between the first and second side surfaces 46 and 48 for the purpose of weight reduction. The first side surface 46 extends radially outwardly from the first lateral surface 36 of the inner attachment portion 32, while the second side surface 48 extends radially outwardly from the second lateral surface 38 of the inner attachment portion 32. The first and second side surfaces 46 and 48 are preferably flat, parallel surfaces with the cutouts 50 extending therebetween.

The annular chain engagement or root portion 34 of the sprocket $S_1$ includes a plurality of chain engagement teeth 52 with a plurality of roots 54 arranged therebetween in a circumferentially spaced, alternating arrangement, as best seen in FIG. 9. A plurality of holes 56 can optionally be formed in the chain engagement portion 34 for weight saving. As mentioned above, in the illustrated embodiment, the sprocket $S_1$ includes twenty-three chain engagement teeth 52.

The sprockets $S_2$-$S_{10}$ and the spacers $U_1$-$U_9$ are conventional bicycle parts that are well known in the bicycle art. Accordingly, the sprockets $S_2$-$S_{10}$ and the spacers $U_1$-$U_9$ will not be explained and/or illustrated in detail herein, except as related to the present invention. In other words, the sprockets $S_2$-$S_{10}$ are substantially identical to the sprocket $S_1$, except that they are smaller (have fewer teeth), do not include the recesses 42 and 44, and may have other conventional modifications due to their decreased size.

Figure 4:
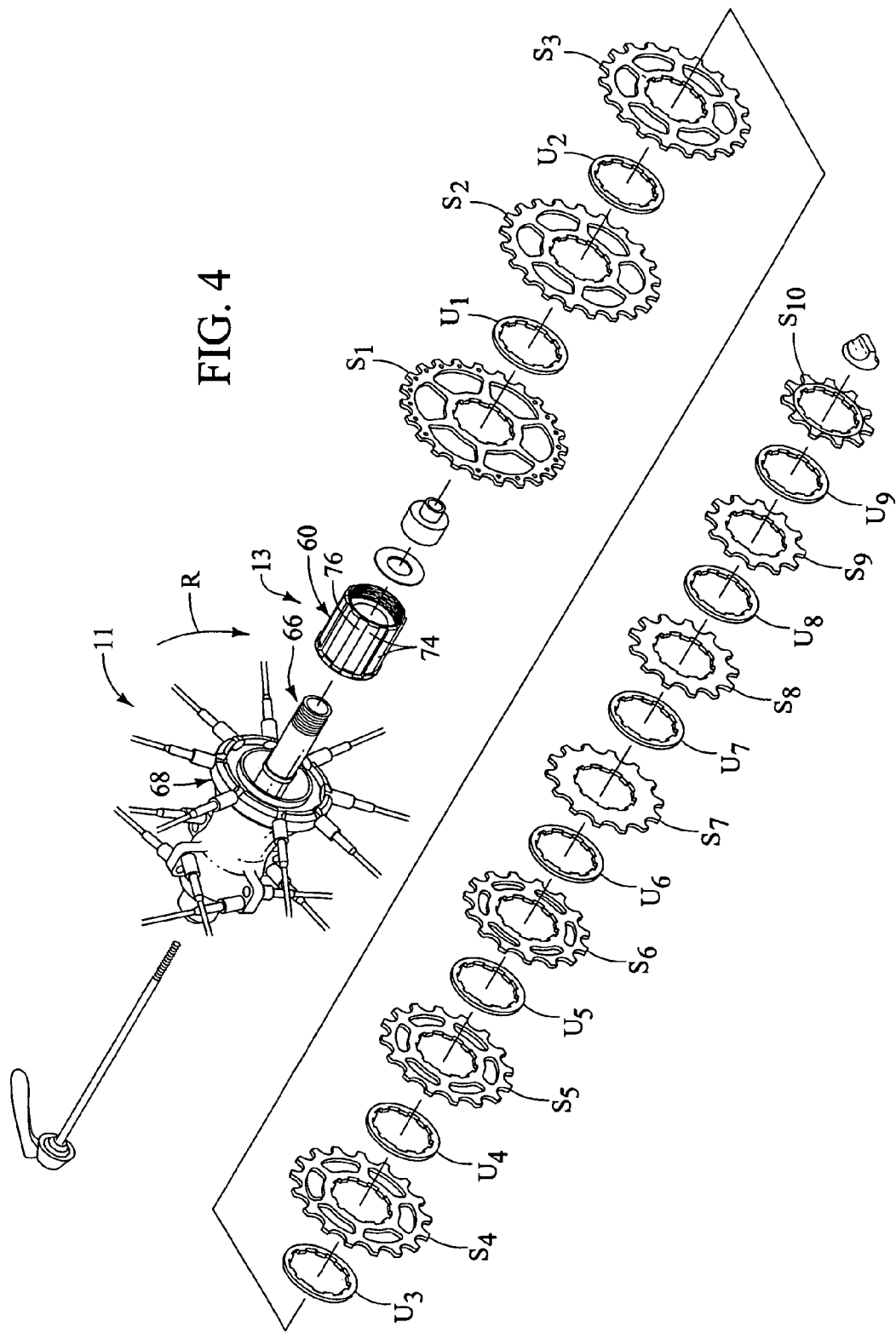
FIG. 4 is an exploded perspective view of the rear hub and sprocket assembly illustrated in FIGS. 2 and 3.

The sprockets $S_1$-$S_{10}$ and the spacers $U_1$-$U_9$ are non-rotatably, fixedly attached on an external surface of the freewheel 13. In particular, the sprockets $S_1$-$S_{10}$ and the spacers $U_1$-$U_9$ are slid onto an external mating surface of the freewheel 13 in an alternating arrangement, as shown in FIG. 4. After the sprockets $S_1$-$S_{10}$ and the spacers $U_1$-$U_9$ are slid onto the freewheel 13, a locking ring LR (FIGS. 2 and 3) is attached to the freewheel 13 in a conventional manner to retain all of the sprockets $S_1$-$S_{10}$ and the spacers $U_1$-$U_9$ on the freewheel 13. The locking ring LR is a conventional member having an externally threaded tubular portion that threads into an end of the freewheel 13 and an annular ring-shaped flange extending from one end of the externally threaded tubular portion. With the above arrangement, sprockets with different numbers of teeth can be substituted relatively easily for the sprockets $S_1$-$S_{10}$, as long as the inner most sprocket has an inner attachment portion like that disclosed herein. Of course, it will be apparent to those skilled in the bicycle art from this disclosure that some or all of the sprockets $S_1$-$S_{10}$ and/or spacers $U_1$-$U_9$ can be fixedly attached to each other via a plurality of fasteners (not shown) such as rivets in a conventional manner prior to mounting on the freewheel 13 as needed and/or desired.

In the illustrated embodiment, the spacers $U_1$-$U_9$ are identical, i.e. the spacers $U_1$-$U_9$ have the same axial thickness and diameter. However, it will be apparent to those skilled in the bicycle art from this disclosure that the spacers $U_1$-$U_9$ can have different configurations as needed and/or desired. Moreover, it will be apparent to those skilled in the bicycle art from this disclosure that various alternative structures can be provided for mounting and spacing the sprockets without departing from the scope of the present invention, as needed and/or desired.

Referring now to FIGS. 2-7, the rear hub 11 and the freewheel 13 will now be explained in more detail. The freewheel 13 basically includes an outer tubular freewheel body 60, an inner tubular freewheel body 62 and a one-way clutch 64. The rear hub basically includes a hub axle 66 and an outer hub body or shell 68 rotatably mounted on the hub axle 66 via bearings or the like in a conventional manner. The hub shell 68 is coupled to the rear bicycle rim via a plurality of spokes in a conventional manner. The inner tubular freewheel body 62 is freely rotatably mounted on the hub axle 66, and non-rotatably connected to the hub shell 68. The outer freewheel body 60 is rotatably mounted relative to the inner freewheel body 62 with the one-way clutch 64 disposed therebetween in a conventional manner. Thus, forward rotation R of the rear sprocket assembly 12 rotates the hub shell 68 to propel the bicycle, while rearward rotation (in a direction opposite of R) of the rear sprocket assembly 12 is freely permitted relative to the inner freewheel body 62 and the hub shell 68.

The freewheel 13 is conventional, except for the outer tubular freewheel body 60. Moreover, the outer freewheel body 60 is conventional except for the external configuration thereof, explained below. Accordingly, the freewheel 13 will not be explained and/or illustrated in detail herein, except as related to the present invention. Rather, it will be apparent to those skilled in the bicycle art from this disclosure that the freewheel 13 includes various conventional parts such as bearing assemblies, seals, attachment rings and the like, as best seen in FIG. 6. Moreover, it will be apparent to those skilled in the bicycle art from this disclosure that the freewheel 13 operates in a conventional manner once the rear sprocket assembly 12 is mounted thereon and that the locking ring LR is threaded into the free end of the hub body 60.

Figure 7:
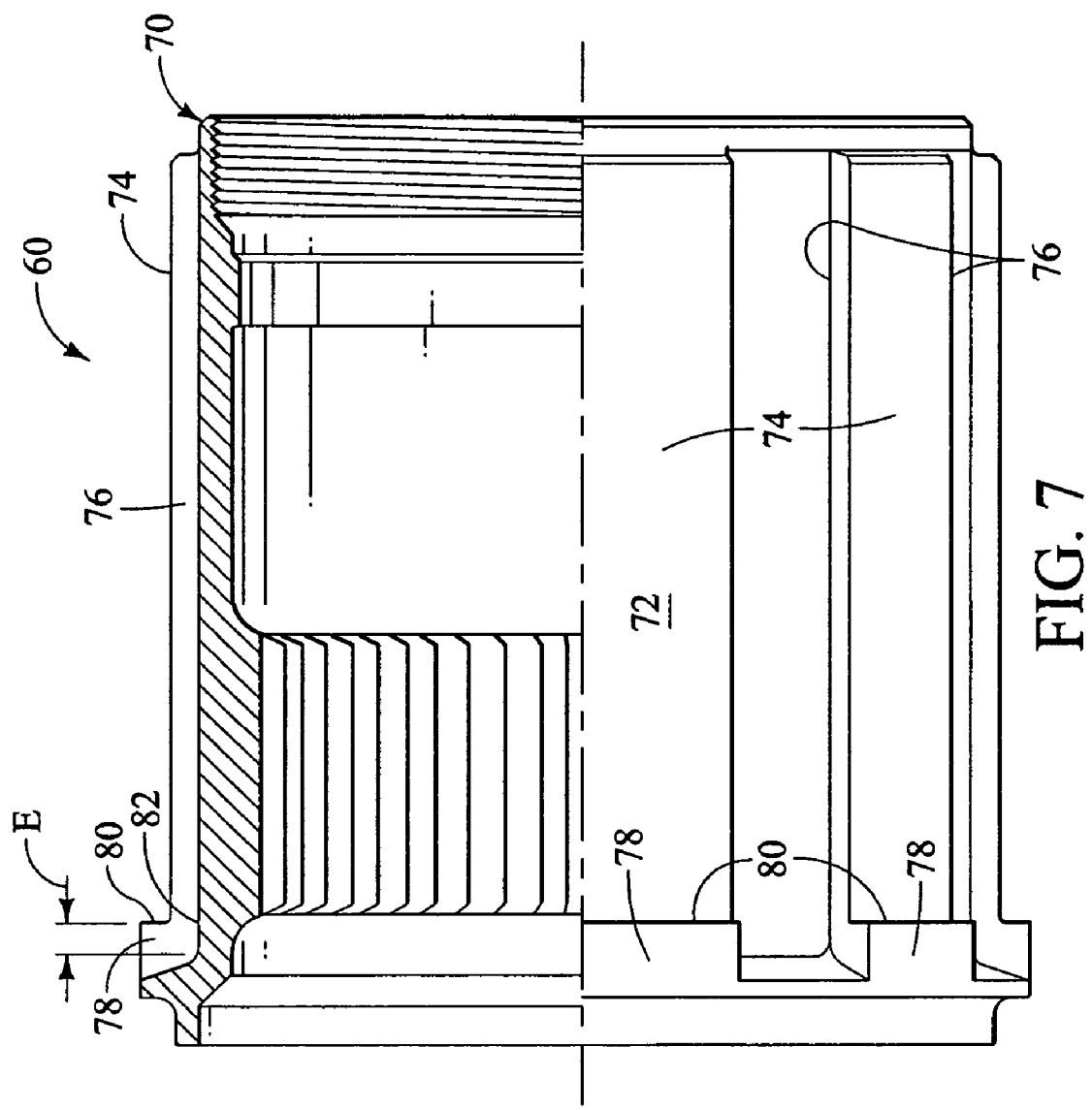
FIG. 7 is an enlarged, partial cross-sectional view of the outer freewheel body of the freewheel of the rear hub illustrated in FIGS. 2-6.

Referring mainly to FIG. 7, the outer tubular freewheel body 60 basically includes an outer tubular portion 70 having an outer surface 72 with a plurality of sprocket engaging splines 74 extending in the axial direction to define a plurality of axially extending sprocket engaging grooves 76 between the splines 74 in an alternating manner. The splines 74 are configured to mate with the slots 43a and 43b of the sprocket $S_1$, while the grooves 76 are configured to mate with the projections 41a and 41b of the sprocket $S_1$. In other words, one of the splines 74 is smaller (not shown) than the remaining splines 74 in order to be received in the positioning slot 43b, while one of the grooves 76 is larger (not shown) than the remaining grooves 76 in order to receive the positioning projection 41b in a conventional manner. Thus, the desired orientation of the sprockets $S_1$-$S_{10}$ relative to each other can be obtained.

Each of the splines 74 includes a stop section 78 disposed at one end thereof (i.e. arranged at the inner axial end thereof). The stop sections 78 extend radially outwardly. Each of the stop sections 78 includes an axially facing abutment surface 80 that is configured and arranged to contact the sprocket $S_1$. In particular, the stop sections 78 and the abutment surfaces 80 are sized and configured such that the stop sections 78 are at least partially received in the recesses 42 and 44. Similar to the splines 74 and the grooves 76, one of the stop sections 78 is smaller (not shown) than the remaining stop sections 78 in order to be received in the positioning recess 44. In other words, the stop sections 78 are shaped to mate with the recesses 42 and 44 of the sprocket $S_1$, with the abutment surfaces 80 contacting the contact surfaces of the recesses 42 and 44 to limit axial movement of the sprocket $S_1$. The abutment surfaces 80 face in an axial direction away from the center plane P (i.e. a first axial direction).

The grooves 76 extend axially toward the center plane P beyond the abutment surfaces 80 in order to accommodate the axially closer position of the sprocket $S_1$ to the center plane P. In a particular, each of the grooves 76 has a bottom surface 82 that extends axially toward the center plane P (i.e. in a second axial direction opposite the first axial direction) beyond the abutment surfaces 80 by a distance E that is at least 0.75 millimeter. In the illustrated embodiment, the distance E is about 1.0 millimeter, and then the bottom surfaces 82 of the grooves 76 begin to taper outwardly. In any case, the distance E should be at least as large as the depth D of the recesses 42 and 44.

Second Embodiment

Figure 11:
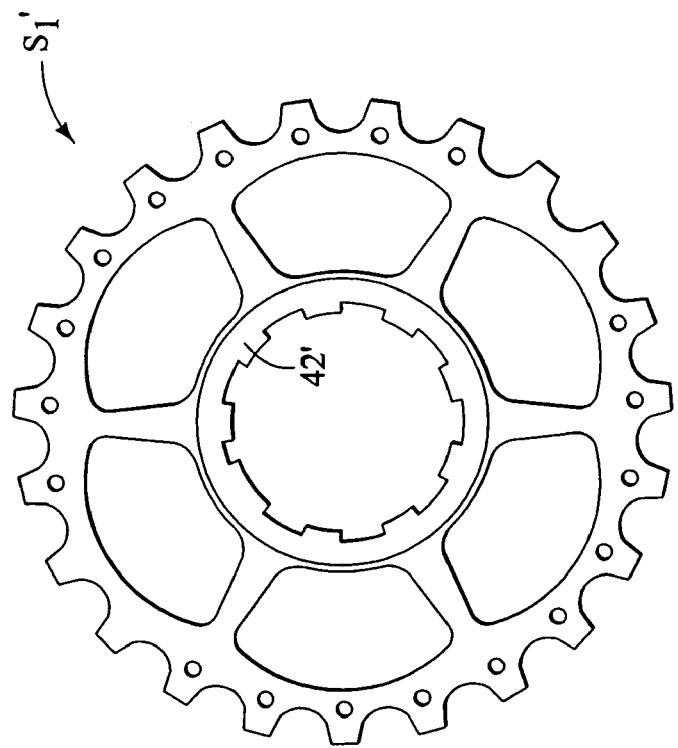
FIG. 11 is an outside elevational view of a bottom sprocket (i.e. a largest, innermost rear sprocket) in accordance with a second embodiment of the present invention.

Referring now to FIG. 11, a modified bottom sprocket $S_1'$ in accordance with a second embodiment will now be explained. The bottom sprocket $S_1'$ replaces the bottom sprocket $S_1$ in the rear sprocket assembly 12 of the first embodiment on the freewheel 13 of the rear hub 11. Thus, a modified rear sprocket assembly is formed when the modified bottom sprocket $S_1'$ is substituted for the bottom sprocket $S_1$ in the rear sprocket assembly 12 of the first embodiment.

The sprocket $S_1'$ is identical to the sprocket $S_1$ of the first embodiment, except the sprocket $S_1'$ includes a single annular recess 42' extending around the inner periphery rather than the multiple recesses 42 and 44 of the first embodiment. The recess 42' functions the same as the multiple recesses 42 and 44 of the first embodiment. In other words, the single annular recess 42' extending around the inner periphery has the same depth as the multiple recesses 42 and 44 of the first embodiment, but simply has a different shape as viewed axially (FIG. 11). The annular shape permits alternate techniques for manufacturing and reduces weight for the sprocket $S_1'$ further. The depth or axial dimension of the single annular recess 42' is the same as the multiple recesses 42 and 44 of the first embodiment. Thus, when the modified rear sprocket assembly is mounted on the rear hub 11, the single annular recess 42' of the sprocket $S_1'$ will have the same configuration and relationship as shown in FIG. 5.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. However, it will be apparent to those skilled in the bicycle art from this disclosure that the descriptions and illustrations of the first embodiment also apply to this second embodiment, except as explained and illustrated herein.

Figure 2:
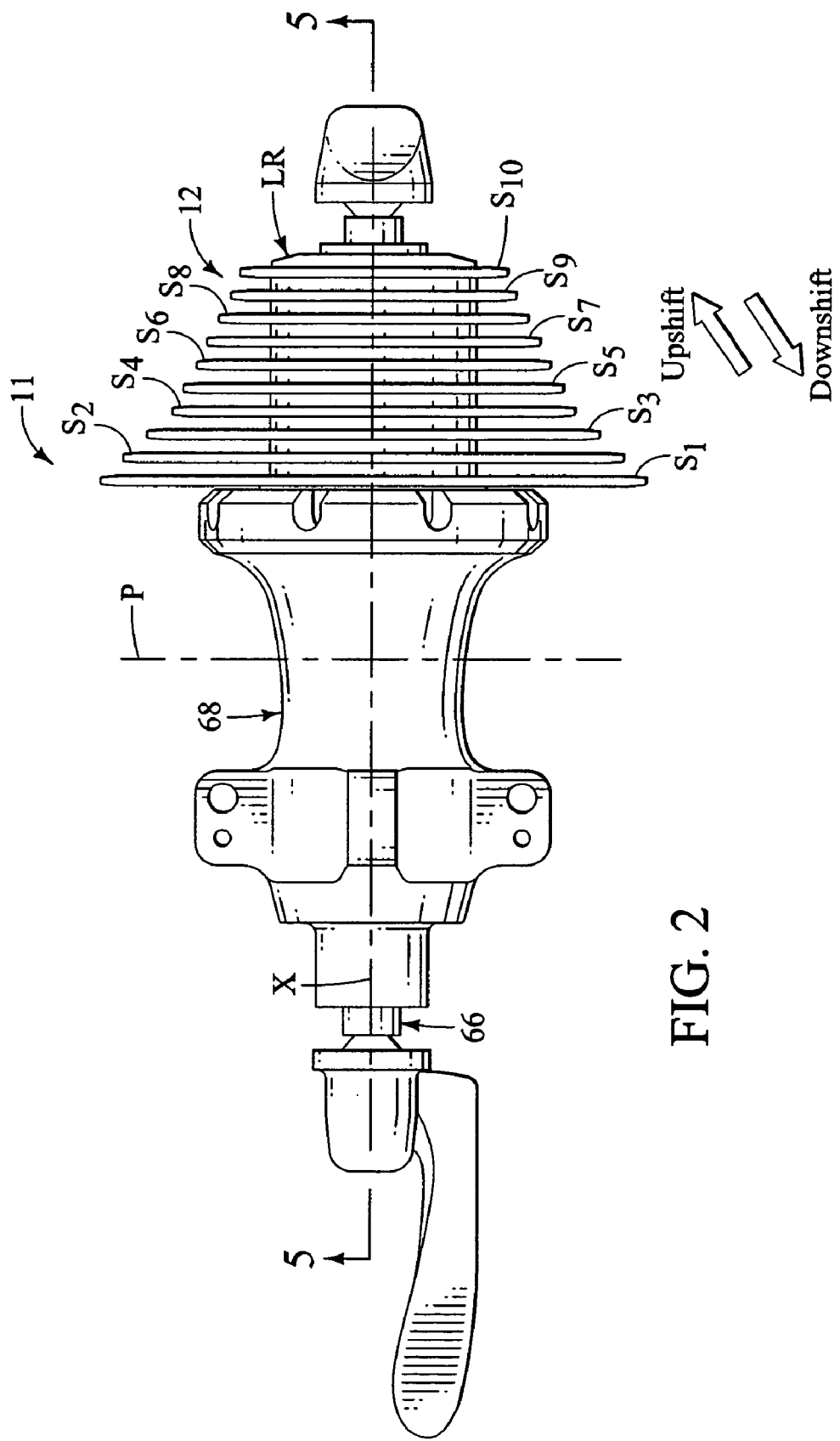
FIG. 2 is an enlarged, top plan view of the rear hub with the multiple sprocket assembly of the bicycle illustrated in FIG. 1, in accordance with the first embodiment of the present invention.
Figure 3:
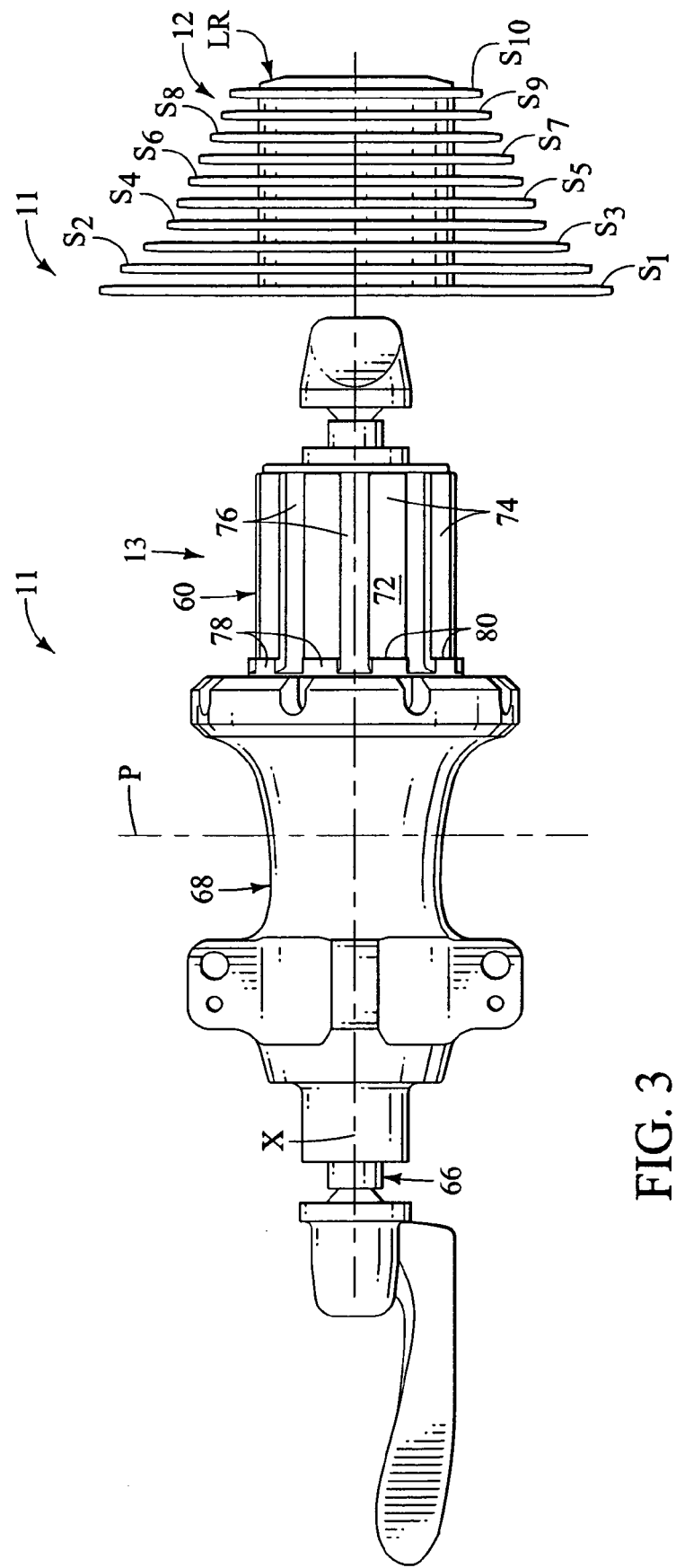
FIG. 3 is a partially exploded, top plan view of the rear hub and sprocket assembly illustrated in FIG. 2.

As used herein, the terms "forward, rearward, above, below, lateral and transverse" as well as any other similar directional terms refer to those directions of a bicycle in its normal riding position, to which the rear sprocket assembly 12 and freewheel 13 are attached. Accordingly, these terms, as utilized to describe the rear sprocket assembly 12 and the freewheel 13 in the claims, should be interpreted relative to the bicycle 10 in its normal riding position. However, the terms "down shift" and "up shift" as used herein in reference to the rear sprocket assembly 12 should be interpreted to mean a shift from smaller to larger sprocket and from larger to smaller sprocket, respectively, as shown in FIG. 2.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A rear sprocket comprising:
   an inner attachment portion having a first lateral surface facing in a first axial direction, a second lateral surface facing in a second axial direction and an inner peripheral edge extending between the first and second lateral surfaces;
   an annular root portion located radially outward of the inner attachment portion with the annular root portion having a first side surface facing in the first axial direction and a second side surface facing the second axial direction such that the second side surface and the second lateral surface lie in a common plane;
   a main body portion connecting the inner attachment portion to the annular root portion; and
   a plurality of teeth extending radially outward from an outer periphery of the root portion,
   the inner peripheral edge of the inner attachment portion having a plurality of hub engaging projections defining a plurality of hub engaging slots disposed between the hub engaging projections, and
   the inner attachment portion including a plurality of individually spaced apart recesses formed on the first lateral surface and extending radially outwardly from the inner peripheral edge, the recesses extending radially outwardly from the hub engaging slots such that the inner attachment portion has an axial thickness measured at the recesses that is smaller than an axial thickness of the inner attachment portion measured at the hub engaging projections, the axial thickness of the inner attachment portion measured at the hub engaging projections being the same as an axial thickness of the main body portion.

2. The rear sprocket according to claim 1, wherein each of the recesses has an axial depth of at least 0.75 mm.

3. The rear sprocket according to claim 1, wherein each of the recesses has an axial depth that is less than an axial thickness of the inner attachment portion extending between the first and second lateral surfaces.

4. The rear sprocket according to claim 1, wherein each of the recesses extends radially outwardly from one of the hub engaging slots from the inner peripheral edge between an adjacent pair of the hub engaging projections.

5. The rear sprocket according to claim 4, wherein each of the recesses has a contact surface parallel to and offset from the first lateral surface.

6. The rear sprocket according to claim 5, wherein the first side surface of the annular root portion faces the first axial direction such that the first side surface and the first lateral surface lie in a common plane.

7. The rear sprocket according to claim 1, wherein each of the recesses has at least one contact surface parallel to and offset from the first lateral surface.

8. The rear sprocket according to claim 7, wherein the first side surface of the annular root portion faces the first axial direction such that the first side surface and the first lateral surface lie in a common plane.

9. The rear sprocket according to claim 1, wherein each of the recesses has a radially inner edge that terminates at a radially outer edge of one of the hub engaging slots.

10. The rear sprocket according to claim 9, wherein each of the recesses has a pair of opposed circumferential edges that are aligned with circumferential edges of an adjacent pair of the hub engaging projections.

* * * * *

(12) EX PARTE REEXAMINATION CERTIFICATE (7945th)
United States Patent
Kamada

(10) Number: US 7,435,197 C1
(45) Certificate Issued: Dec. 21, 2010

(54) REAR SPROCKET FOR BICYCLE TRANSMISSION

(75) Inventor: Kenji Kamada, Osaka (JP)

(73) Assignee: Shimano, Inc., Sakai, Osaka (JP)

Reexamination Request:
No. 90/010,994, May 13, 2010

Reexamination Certificate for:
Patent No.: 7,435,197
Issued: Oct. 14, 2008
Appl. No.: 11/126,409
Filed: May 11, 2005

(51) Int. Cl.
*F16H 55/30* (2006.01)

(52) U.S. Cl. .................. 474/152; 474/903; 474/902
(58) Field of Classification Search ............ 474/78, 474/152, 902, 903
See application file for complete search history.

(56) References Cited

U.S. PATENT DOCUMENTS

| 3,972,245 A | 8/1976 | Allen |
| 2003/0064844 A1 | 4/2003 | Lin |

FOREIGN PATENT DOCUMENTS

| EP | 1439117 | 7/2004 |
| GB | 498258 | 1/1939 |

*Primary Examiner*—Matthew C. Graham

(57) ABSTRACT

A bicycle transmission has among other things a rear hub with a freewheel with an outer freewheel body supporting a plurality of sprockets. A chain is shifted between adjacent pairs of the sprockets by a rear derailleur. Each sprocket includes inner attachment portion and a chain engaging portion having annular root portion and a plurality of teeth. The largest (low gear) sprocket has one or more recesses in the lateral surface that faces towards the center of the bicycle so that the largest (low gear) sprocket overlaps the abutments of the outer freewheel body.

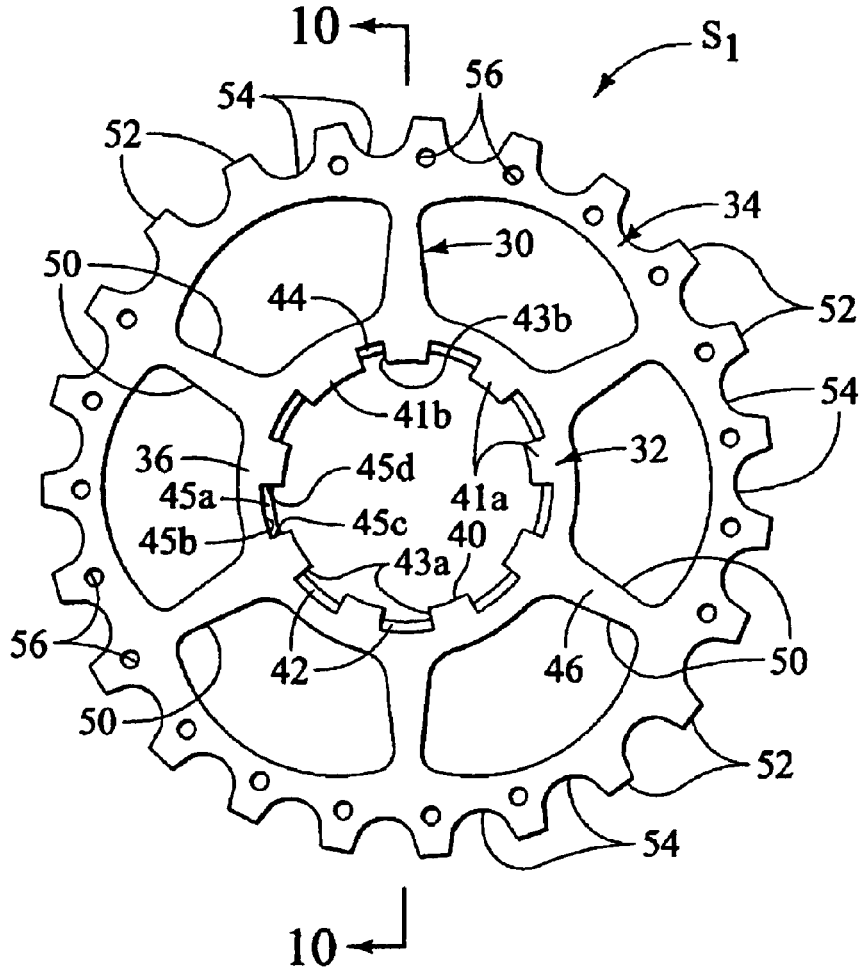

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

* * * * *